United States Patent [19]

Mizokami

[11] 4,390,258
[45] Jun. 28, 1983

[54] PHOTOMERIC CIRCUIT FOR CAMERA

[75] Inventor: Kazunori Mizokami, Hachioji, Japan

[73] Assignee: Olympus Optical Co. Ltd., Tokyo, Japan

[21] Appl. No.: 325,728

[22] Filed: Nov. 30, 1981

[30] Foreign Application Priority Data

Dec. 15, 1980 [JP] Japan ............................ 55-176762
Dec. 18, 1980 [JP] Japan ............................ 55-180064

[51] Int. Cl.³ .................. G03B 7/083; G03B 17/18; G01J 1/46
[52] U.S. Cl. .......................... 354/24; 354/51; 354/60 E; 356/215; 356/223; 356/226; 250/214 P
[58] Field of Search ............... 354/24, 50, 51, 60 R, 354/49, 59, 60 E, 60 L, 53; 356/215, 218, 223, 226; 250/214 P, 214 AG, 214 AL; 324/96

[56] References Cited

U.S. PATENT DOCUMENTS 3,641,891  2/1972  Burgarella ........................ 354/24

FOREIGN PATENT DOCUMENTS 53-46725   4/1978  Japan .
54-151029 11/1979  Japan .

Primary Examiner—William B. Perkey
Attorney, Agent, or Firm—Weinstein & Sutton

[57] ABSTRACT

A photometric circuit includes a differentiator arranged in cascade connection with an integrating circuit including an integrating capacitor which directly integrates a photocurrent produced by a photoelectric transducer element which is used for photometry. In this manner, a photocurrent output is derived from the integrated output from the integrating circuit.

16 Claims, 8 Drawing Figures

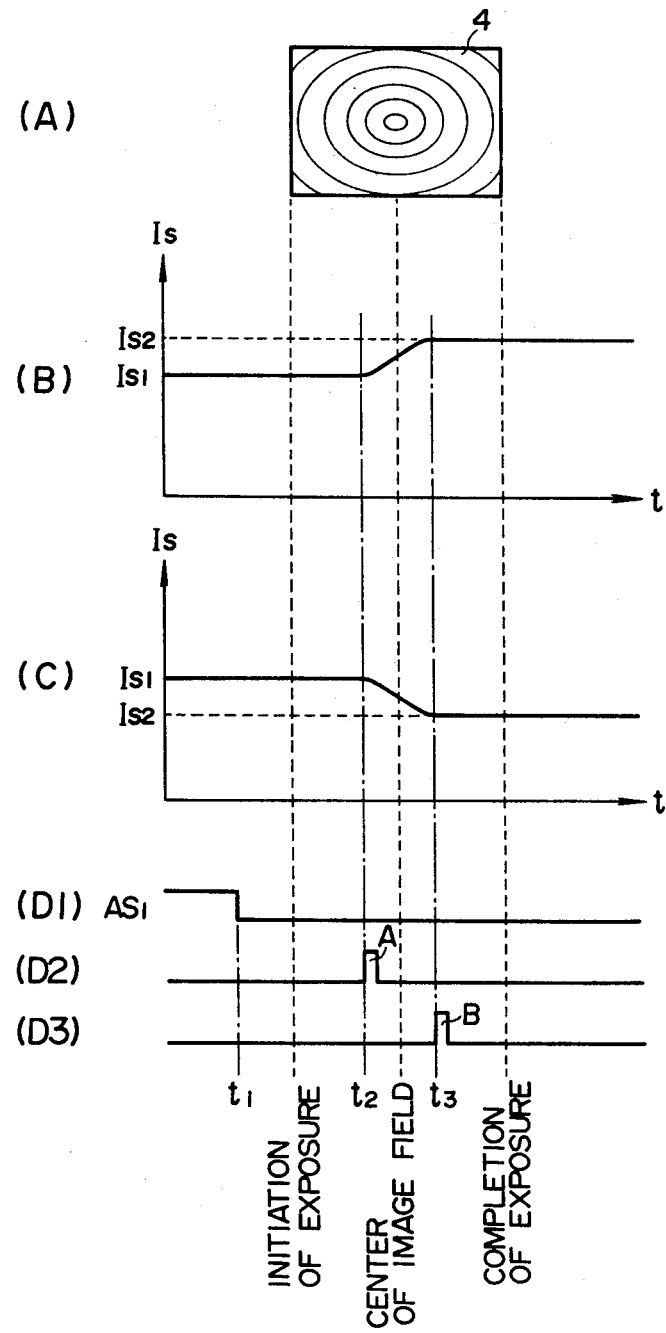

PHOTOMERIC CIRCUIT FOR CAMERA

BACKGROUND OF THE INVENTION

The invention relates to a photometric circuit for a camera, and more particularly, to a photometric circuit of a so-called photocurrent direct integrating type in which a photocurrent produced by a photoelectric transducer element, which is used for purposes of photometry, is directly integrated by an integrating capacitor.

As is well recognized, a photometric circuit which utilizes an integrating capacitor for directly integrating a photocurrent produced by a photoelectric transducer element and which utilizes the integral for purpose of automatic exposure control or the like is extensively used in cameras of film surface reflection photometry type. As compared with the so-called logarithmic compression photometric circuit in which a photocurrent is initially converted into a logarithmically compressed voltage, the photometric circuit of direct integrating type has the following features:

1 The circuit arrangement is simplified, and avoids the need for any temperature compensation.

2 A good linearity in the integrating response permits a real time tracking of a varying photocurrent over an extensive range, by properly constructing an integrating amplifier. This assures a high accuracy in integrating a high brightness input such as may be produced by flashlight from an electronic flash or in integrating a low brightness input which involves an exposure over a prolonged period of time.

3 A response lag upon power on is negligibly small as compared with the circuit of logarithmic compression type, and this eliminates the need for a special compensation circuit.

On the other hand, the photometric circuit of direct integrating type has the following drawbacks as compared with the circuit of logarithmic compression type:

1 A dynamic range of photometry is reduced.

2 Since the photometric output can only be derived in the form of an integral output, information which may be used for other purposes such as display, for example, the magnitude of photocurrent, cannot be directly obtained.

On the other hand, in the conventional photometric device utilizing a reflection photometry technique, the reflectivity of the film surface is presumed to be constant irrespective of the variety of films, and the surface of a first shutter blind is worked to provide a reflectivity which is substantially equal to the reflectivity of an average film surface so that the photometry of reflected light from both the first blind surface and the film surface enables an exposure control signal to be derived.

However, in practice, the reflectivity of the film surface varies as the variety of the film is changed, and where a picture is taken using a film having a reflectivity which differs from the reflectivity of the average film, a proper exposure control cannot be achieved. In addition, a proper exposure control is also precluded where the reflectivity of the first blind surface or the film surface varies or fluctuates.

To overcome these difficulties, there has been proposed several reflection photometry devices (see Japanese Laid-Open Patent Applications No. 46,725/1978 and No. 151,029/1979), which comprise a first photometric circuit used for exposure control and a second photometric circuit used for correction purposes. During running of the first blind or in the course of the exposure, the second photometric circuit determines reflected light from the first blind which moves across the image field as well as reflected light from the film separately, and forms a difference between the photometric signals in order to provide a correction of an output from the first photometric circuit.

However, these reflection photometry devices require (i) a photometric circuit which is used to provide a correction to thereby result in a complex circuit arrangement, and (ii) involve an error between the two photometric systems, which prevents a correction of a high accuracy from being achieved. The error is caused by differential locations where the photoelectric transducer elements of both photometric circuits are disposed to thereby change the photometric distribution of both elements with respect to the image field. Such error cannot be completely eliminated as long as the two photometric systems are employed.

SUMMARY OF THE INVENTION

It is an object of the invention to eliminate the drawback of a conventional photometric circuit of photocurrent direct integrating type which is only capable of providing a photometric output in the form of an integrated output, by providing a photometric circuit including a differentiator which is arranged in cascade connection with the output of an integrating circuit, thus allowing a photocurrent to be read out in real time during the photometry, in addition to providing an integrated output of the photocurrent.

It is another object of the invention to eliminate the disadvantage of a conventional reflection photometry device which requires the provision of a separate correction photometric circuit, by providing a photometric circuit including a differentiator arranged in cascade connection with the output of an integrating circuit so that an integrated output of the photocurrent for the purpose of exposure control is provided by the integrating circuit while a photocurrent output for a correction purpose is provided by the differentiator.

According to the invention, while a photometric circuit of photocurrent direct integrating type is used, the magnitude of a photocurrent being determined can be read out in real time through a differentiator, thus enabling the detection of a change in or a display of the brightness being determined in terms of the photocurrent.

Also, the invention enables a single photometry system to produce an integrated output of the photocurrent which is utilized for exposure control and to produce a photocurrent output which is used for correction purposes. In this manner, an error of the photometry is reduced to a negligibly small value as compared with the photometry utilizing two photometry systems, thus permitting an exposure control of a high accuracy. Also, the circuit arrangement is greatly simplified.

BRIEF DESCRIPTION OF THE DRAWINGS

FIG. 3(A) is a schematic illustration of a photometry response of a photoelectric transducer element, utilized for photometry in the photometric circuit of FIG. 2, with respect to an image field;

FIGS. 3(B) and (C) graphically show exemplary changes of the photocurrent produced by the transducer element of FIG. 2; and FIGS. 3(D1), (D2) and (D3) are timing charts illustrating the operation of the photometric circuit shown in FIG. 2.

DESCRIPTION OF PREFERRED EMBODIMENTS

Figure 1:
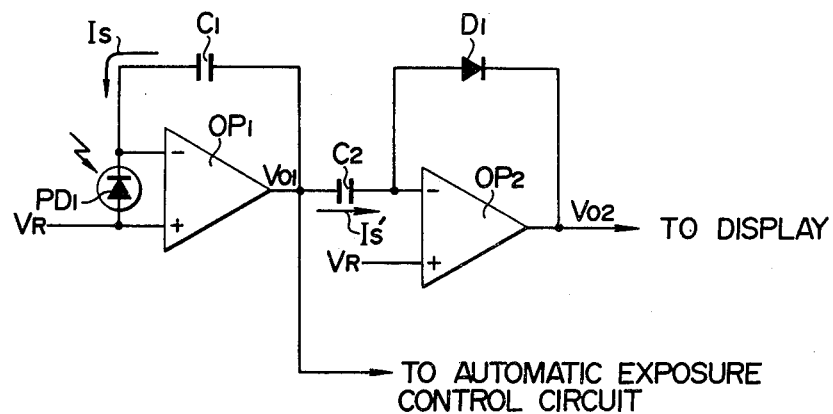
FIG. 1 is a circuit diagram of a photometric circuit according to one embodiment of the invention.

Referring to FIG. 1, there is shown a photometric circuit for a camera according to one embodiment of the invention. It comprises photoelectric transducer element PD such as silicon photodiode used for photometry, a first operational amplifier OP1 having the transducer element PD1 connected reversely between its inverting and its non-inverting input terminal, an integrating capacitor C1 connected across the inverting input terminal and the output terminal of the amplifier OP1, a differentiator capacitor C2 having its one end arranged in cascade connection with the output terminal of the amplifier OP1, a second operational amplifier OP2 having the other end of the differentiator capacitor C2 connected to its inverting input terminal, and a logarithmic compression diode D1 forwardly connected across the inverting input terminal and the output terminal of the amplifier OP2.

The amplifier OP1 forms an integrating circuit together with the capacitor C1, and a reference voltage VR is applied to its non-inverting input terminal. It will be seen that the capacitor C2 forms a differentiator. The amplifier OP2 forms a logarithmic compression circuit together with the diode D1, and the reference voltage VR is applied to its non-inverting input terminal. The output terminal of the first amplifier OP1 is connected to an automatic exposure control circuit, not shown, while the output terminal of the second amplifier OP2 may be connected to a display, not shown, for example.

In operation, assuming that the incidence of light upon the transducer element PD1 causes the latter to produce a photocurrent Is, the current is integrated by the capacitor C1. In response thereto, an output voltage VO1 is developed at the output of the amplifier OP1 for charging the capacitor C2. The voltage VO1 is represented as follows:

$$VO1 = \frac{1}{C1} \int Is \, dt = \frac{Is}{C1} t + VR \quad (1)$$

It will be seen that the voltage linearly increases with time t. The output voltage VO1 is supplied to an automatic exposure control circuit, not shown, in order to control the closure of a shutter, for example.

A charging current Is' which depends on the magnitude of the voltage VO1 flows through the differentiator capacitor C2, whereby charge Q is stored thereacross. From the equation (1), the charge Q can be expressed as follows:

$$Q = C2 \, VO1 = \frac{C2}{C1} Is \, t + C2 \, VR \quad (2)$$

Hence, the charging current Is' is expressed as follows:

$$Is' = \frac{dQ}{dt} = \frac{C2}{C1} Is \quad (3)$$

The charging current Is' flows into the inverting input terminal of the amplifier OP2. Since the ratio C2/C1 is constant, the magnitude of the current Is' is proportional to the photocurrent Is, thus representing photocurrent information. The current Is' is logarithmically compressed by the combination of the diode D1 and amplifier OP2, and the amplifier OP2 produces an output voltage VO2 which is defined as follows:

$$VO2 = -\frac{kT}{q} \ln Is' = -\frac{kT}{q} \ln\left(\frac{C2}{C1} Is\right) \quad (4)$$

where k represents Boltzmann constant, T absolute temperature and q unit charge. It is to be understood that the reverse saturated current of the diode D1 is neglected in deriving the equation (4). The output voltage VO2 may be supplied to a display, not shown, for example, for displaying the brightness of an object being photographed.

Figure 2:
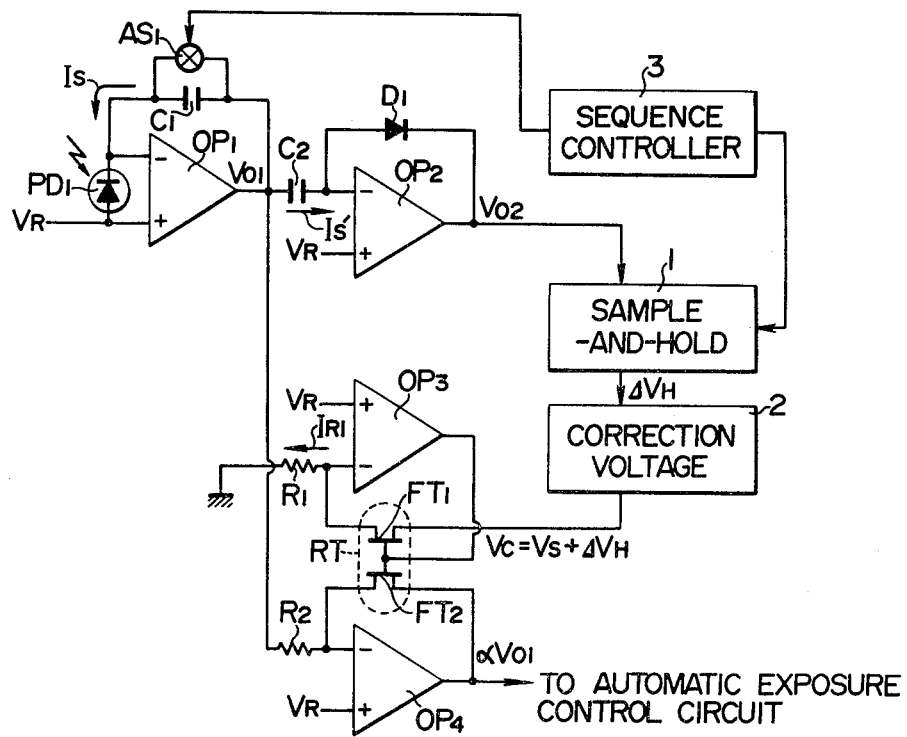
FIG. 2 is a circuit diagram of a photometric circuit of reflection photometry type according to another embodiment of the invention which utilizes the circuit arrangement of FIG. 1.

FIG. 2 shows a photometric circuit according to another embodiment of the invention which utilizes the photometric circuit shown in FIG. 1. The photometric circuit of FIG. 2 essentially comprises, in addition to the circuit arrangement of FIG. 1, a sample-and-hold circuit 1 connected to the output of the second amplifier OP2 contained in the photometric circuit of FIG. 1, a correction voltage circuit 2 fed from the sample-and-hold circuit 1, a voltage controlled variable resistance element RT including a first and a second monolithic pair field effect transistor FT1 and FT2, with the drain of the first transistor FT1 connected to the output of the correction voltage circuit 2 and the gate of the first and the second transistor FT1, FT2 interconnected, a third operational amplifier OP3 having its inverting input terminal connected to the source of the first transistor FT1 and having its output connected to the gate thereof, a fourth operational amplifier OP4 having its inverting input terminal connected to the source of the second transistor FT2 and having its output terminal connected to the drain thereof, a trigger analog switch AS1 connected in shunt with the capacitor C1, and a sequence controller 3 connected between the gate of the switch AS1 and a control terminal of the sample-and-hold circuit 1.

The reference voltage VR is applied to the non-inverting input terminal of the third amplifier OP3 while its inverting input terminal is connected to the ground through resistor R1. The third amplifier OP3 operates to produce an output voltage applied to the gate of both transistors FT1, FT2 which establishes a voltage, which is applied to its inverting input terminal from the correction voltage circuit 2 through the transistor FT1, equal to the reference voltage VR which is applied to its non-inverting input terminal. The transistors FT1, FT2 of the voltage controlled variable resistance element RT have identical $I_D$-$V_{GS}$ responses, and exhibit d.c. resistances $R_{ON1}$, $R_{ON2}$ (hereafter referred to as ON-resistance) of an equal magnitude when the source-drain path of each of the transistors is rendered conductive. The fourth operational amplifier OP4 has its inverting input terminal connected through resistor R2 to the output terminal of the first amplifier OP1, and the reference voltage VR is applied to its non-inverting input terminal. The operational amplifier OP4 forms a variable gain inverting amplifier together with the resistor R2 and the ON-resistance $R_{ON2}$ of the second transistor FT2. The variable gain inverting amplifier has an amplification factor which is determined by the ratio $\alpha = R_{ON2}/R2$. Since the resistance of resistor R2 is constant, the amplification factor varies with the change in the magnitude of the ON-resistance $R_{ON2}$.

The transducer element PD1 is disposed opposite to a focal plane shutter, not shown, at a location out of the taking path of the camera so as to exhibit a photometry response with respect to an image field 4 which is centrally emphasized as shown in FIG. 3(A). The measurement of reflected light from the image field 4 by the transducer element PD1 is initiated by turning the analog switch AS1 off at time $t_1$ immediately before the initiation of an exposure of a film surface which occurs by running a first shutter blind, in response to a signal from the sequence controller 3, as indicated in FIG. 3(D1).

In addition to controlling the turn-on and -off of the analog switch AS1, the sequence controller 3 supplies sampling pulses A and B to the sample-and-hold circuit 1 at times $t_2$ and $t_3$ which are immediately before and after the passage of the first blind through the center of the image field 4, as shown in FIGS. 3(D2) and (D3). In response to these sampling pulses A and B, the sample-and-hold circuit 1 operates to sample and hold the output voltages VO2A, VO2B corresponding to the photocurrent which the amplifier OP2 then outputs. A difference voltage $\Delta V_H = VO2A - VO2B$ is supplied to the correction voltage circuit 2, which produces a reference voltage Vs of a magnitude effective to make the ON-resistances $R_{ON1}$, $R_{ON2}$ of the transistors FT1, FT2 equal to the magnitude of the resistor R2 until the first blind is fully open. However, after the first blind is fully open, it produces a correction voltage $Vc = Vs + \Delta V_H$, thus the reference voltage added with the difference voltage $\Delta V_H$.

In operation, as a shutter release button, not shown, of the camera is depressed, the focal plane shutter is released, causing the first blind to begin running. As the first blind begins running, the analog switch AS1 is turned off by the sequence controller 3 at time $t_1$ which is immediately before the exposure of the film surface, as indicated in FIG. 3(D1). Consequently, the light which is reflected by the surface of the first blind impinges upon the transducer element PD1, which then produces the photocurrent Is, causing the capacitor C1 to begin charging. As mentioned previously in connection with the operation of the photometric circuit of FIG. 1, the first amplifier OP1 produces the output voltage VO1 defined by the equality (1) while the second amplifier OP2 produces the output voltage VO2 defined by the equality (4).

At time $t_2$ which is immediately before the edge of the first blind moves past the center of the image field 4, the sequence controller 3 supplies the sampling pulse A to the sample-and-hold circuit 1, as indicated in FIG. 3(D2), whereby the prevailing output voltage VO2A of the amplifier OP2 is retained by the sample-and-hold circuit 1. At time $t_2$, the first blind has not yet moved past the center of the image field 4, so that the transducer element PD1 effects photometry of reflected light primarily from the first blind surface. Representing the photocurrent which is based on the reflectivity of the first blind surface by Is1 (see FIGS. 3(B) and (C)), the voltage VO2A can be derived from the equation (4) as follows:

$$VO2A = -\frac{kT}{q} \ln\left(\frac{C2}{C1} Is1\right) \tag{5}$$

Subsequently, at time $t_3$ which is immediately after the edge of the first blind has moved past the center of the image field 4, the sequence controller 3 supplies the sampling pulse B to the sample-and-hold circuit 1, as indicated in FIG. 3(D3), whereby the magnitude of the output voltage VO2B from the amplifier OP2 which prevails at time $t_3$ is retained by the sample-and-hold circuit 1. Since the first blind has already moved past the center of the image field 4 at time $t_3$, the transducer element PD1 effects photometry of reflected light primarily from the film surface. Representing the photocurrent which is based on the reflectivity of the film surface by Is2 (see FIGS. 3(B) and (C)), the voltage VO2 can be derived from the equation (4) as follows:

$$VO2B = -\frac{kT}{q} \ln\left(\frac{C2}{C1} Is2\right) \tag{6}$$

Hence, the sample-and-hold circuit 1 produces a difference between the voltages VO2A and VO2B:

$$\Delta V_H = VO2A - VO2B \tag{7}$$

$$= -\frac{kT}{q}\left[\ln\left(\frac{C2}{C1} Is1\right) - \ln\left(\frac{C2}{C1} Is2\right)\right]$$

In the case when the reflectivity of a particular film loaded into the camera is greater than the reflectivity of a standard film, the photocurrent Is produced by the transducer element PD1 which is disposed to effect photometry with an emphasis on the central portion of the image field 4 will remain substantially constant until time $t_2$, gradually increases between times $t_2$ and $t_3$, and remains substantially constant after time $t_3$, as indicated in FIG. 3(B), assuming that there occurs no change in the brightness of an object being photographed in the course of running of the first blind. This is because the reflectivity of the first blind is adjusted to be equal to the reflectivity of the standard film. Accordingly, the magnitude of the voltage VO2A is less than that of the voltage VO2B, and hence it follows that $$\Delta V_H = VO2A - VO2B < 0 \tag{8}$$

On the contrary, in the case when the reflectivity of a particular film loaded into the camera is less than the reflectivity of a standard film, the photocurrent Is produced by the transducer element PD1 remains substantially constant until time $t_2$, gradually decreases between times $t_2$ and $t_3$ and remains substantially constant after time $t_3$, as indicated in FIG. 3(C). Accordingly, the magnitude of the voltage VO2A is greater than that of the voltage VO2B, and hence it follows that $$\Delta V_H = VO2A - VO2B > 0 \tag{9}$$

When the film surface is fully exposed and the first blind becomes fully open, the correction voltage circuit 2 which has been producing the reference voltage Vs which is effective to make the ON-resistances $R_{ON1}$, $R_{ON2}$ of the transistors FT1, FT2 equal to the magnitude of the resistor R2, now produces the correction voltage $Vc=Vs+\Delta V_H$, which is the reference voltage Vs added with the reference voltage $\Delta V_H$. The correction voltage Vc is applied to the drain of the first transistor FT1.

A voltage which balances the voltage at the noninverting terminal and the voltage at the inverting input terminal of the amplifier OP3 through the operational amplifier action, namely, the reference voltage VR is applied to the source of the transistor FT1. Representing the current flowing through the transistor R1 connected between the source of the transistor FT1 and the ground by $I_{R1}$, it is defined as follows:

$$I_{R1} = \frac{VR}{R1} \qquad (10)$$

The current $I_{R1}$ flows through the transistor FT1, and hence the ON-resistance $R_{ON1}$ across the drain and source of the transistor FT1 can be represented as follows:

$$R_{ON1} = \frac{Vc - VR}{I_{R1}} \qquad (11)$$

Substitution of the equation (10) into the equation (11) yields:

$$R_{ON1} = \left(\frac{Vc - VR}{VR}\right) R1 = \left(\frac{Vc}{VR} - 1\right) R1 \qquad (12)$$

As mentioned previously, the voltage controlled variable resistance element RT is formed as a monolithic element so that the first and the second field effect transistor FT1 and FT2 have identical responses. Since their gates are connected to the output terminal of the amplifier OP3 in common, it follows that the ON-resistances $R_{ON2}$ of the second transistor FT2 is equal in magnitude to the ON-resistance $R_{ON1}$ of the first transistor. Thus $$R_{ON2} = R_{ON1} = \left(\frac{Vc}{VR} - 1\right) R1 \qquad (13)$$

In the equation (13), both the resistor R1 and the reference voltage VR are constant, and hence the ON-resistance $R_{ON2}$ is a function of the correction voltage Vc.

Before the shutter is fully open, the correction voltage Vc is equal to the reference voltage Vs, and the circuit parameters are chosen so that the ON-resistance $R_{ON2}$ is equal in magnitude to the resistor R2 at this time, it follows:

$$R2 = \left(\frac{Vs}{VR} - 1\right) R1 \qquad (14)$$

The ON-resistance $R_{ON2}$ across the drain and source of the second transistor FT2 is a function of the correction voltage Vc as shown by the equality (13) and since the correction voltage Vc is a sum of the reference voltage Vs and the difference voltage $\Delta V_H$, it follows that the ON-resistance $R_{ON2}$ is a function of the difference voltage $\Delta V_H$. Since the amplification factor $\alpha$ of the variable gain, inverting amplifier formed by the operational amplifier OP4 is represented as the ratio of the resistor R2 and the ON-resistance $R_{ON2}$, it follows from the equation (13):

$$\alpha = \frac{R_{ON2}}{R2} = \left(\frac{Vc}{VR} - 1\right) \frac{R1}{R2} \qquad (15)$$

Substitution of the equation (14) into the equation (15), and rearranging utilizing the relationship $Vc=Vs+\Delta V_H$ result in the following equation:

$$\alpha = 1 + \frac{\Delta V_H}{VR} \cdot \frac{R1}{R2} \qquad (16)$$

Thus it is seen that the amplification factor $\alpha$ varies with the difference voltage $\Delta V_H$.

For $\Delta V_H > 0$, or when the reflectivity of a particular film loaded into the camera is less than the reflectivity of the first blind, it follows from the equation (16) that the amplification factor $\alpha$ is greater than 1. In other words, the integrated output VO1 of the photocurrent as supplied by the amplifier OP1 is increased to $\alpha$ times the value which is obtained when the standard film is loaded. The output appears at the output of the amplifier OP4, thus compensating for a reduction in the integrated output VO1 which results from the reduced reflectivity of the film. For $\Delta V_H < 0$ or when the reflectivity of the loaded film is greater than the reflectivity of the first blind, the amplification factor $\alpha$ is less than 1. In other words, the integrated output VO1 from the amplifier OP1 is reduced by a factor of $\alpha$ relative to the value which is obtained when the standard film is loaded, as it appears at the output of the amplifier OP4, thus compensating for an increased magnitude of the integrated output VO1 which results from the increased reflectivity of the film. For $\Delta V_H = 0$ or when the reflectivity of the loaded film is equal to the reflectivity of the first blind, the amplification factor $\alpha$ is equal to 1, and hence the integrated output VO1 is outputted from the amplifier OP4 without any amplification or reduction.

By way of example, assuming that a film of $-0.5$ Ev is used as compared with the reflectivity of the standard film or the reflectivity of the first blind, it is only necessary that the output from the amplifier OP4 be corrected by a factor of ln $2^{0.5} = \sqrt{2}$. Hence, the ON-resistance $R_{ON2}$ of the transistor FT2 is changed so that $$\alpha = \frac{R_{ON2}}{R2} = \sqrt{2} \qquad (17)$$

The correction voltage Vc which must be outputted from the correction voltage circuit 2 to provide the ON-resistance $R_{ON2}$ which is equal to $\sqrt{2}$ R2 can be derived from the equation (13) as follows:

$$\sqrt{2}\, R2 = \left(\frac{Vc}{VR} - 1\right) R1 \qquad (18)$$

Dividing both sides of the equation (18) by both sides of the equation (14), and rearranging, we have $$V_c = \sqrt{2}\, V_S - (\sqrt{2} - 1) V_R \quad (19)$$

Utilizing the relationship $V_c = V_s + \Delta V_H$, $$\Delta V_H = (\sqrt{2} - 1)(V_s - V_R) \quad (20)$$

In the actual circuit, the circuit parameters such as the reference voltages Vs, VR, resistors R1, R2 and capacitors C1, C2 are chosen in consideration of the $I_D - V_{DS}$ response of the transistors FT1, FT2 so that $\Delta V_H$ defined by the equality (20) coincides with the difference output VO2A − VO2B from the amplifier OP2. Conversely, the correction voltage circuit 2 outputs the correction voltage Vc which satisfies the equation (19), and the integrated output VO1 from the amplifier OP1 is corrected by a factor of $\sqrt{2}$ by the amplifier OP4 as it is outputted.

The corrected output αVO1 is supplied to an automatic exposure control circuit (not shown) which is connected to an electromagnet constraining a second blind at its wound position. When the output αVO1 reaches a proper level, the control circuit releases the second blind from constraint by the electromagnet, thus allowing the shutter to be closed. Thus it will be seen that the exposure control is not based on the integrated output VO1 from the amplifier OP1, but is based on the corrected output αVO1 which takes the reflectivity of a particular film into consideration, thus allowing pictures to be taken always with a proper exposure, independently from any variety of a particular film being loaded into the camera.

What is claimed is:

1. A photometric circuit for a camera including a photoelectric transducer element which is used for photometry by producing a photocurrent, and an integrating circuit including an integrating capacitor which directly integrates the photocurrent to provide an integrated output of photocurrent, characterized by a differentiator arranged in cascade connection with the integrating circuit to produce a photocurrent, output by differentiating the integrated output.

2. The photometric circuit according to claim 1, in which the integrating circuit comprises a first operational amplifier having the transducer element connected across its inverting and its non-inverting input terminals, and an integrating capacitor connected across the inverting input terminal and the output terminal of the operational amplifier.

3. The photometric circuit according to claim 1, in which the differentiator comprises a differentiator capacitor.

4. The photometric circuit according to claim 1, in which the output terminal of the differentiator is connected to a logarithmic compression circuit, whereby the photocurrent output is outputted from the logarithmic compression circuit as a voltage signal which is logarithmically compressed.

5. The photometric circuit according to claim 4, in which the logarithmic compression circuit comprises a second operational amplifier having the differentiator connected to its inverting input terminal, and a logarithmic compression diode connected across the inverting input terminal and the output terminal of the operational amplifier.

6. A photometric circuit for a camera comprising
a photoelectric transducer element disposed for photometry which is centrally emphasized on an image field;
an integrating circuit including an integrating capacitor which directly integrates a photocurrent produced by the transducer element to provide an integrated output of photocurrent;
a differentiator arranged in cascade connection with the output of the integrating circuit to produce a photocurrent output by differentiating the integrated output;
a correction voltage circuit for producing a correction voltage in accordance with a difference between the magnitude of the photocurrent output from the differentiator which is developed in response to reflected light from a first blind surface immediately before an edge of the first blind of a focal plane shutter moves past the center of the image field and the magnitude of the photocurrent output from the differentiator which is developed in response to reflected light from a film surface immediately after the edge of the first blind has moved past the center of the image field;
and a variable gain amplifier receiving the integrated output from the integrating circuit and adapted to have its amplification factor changed in accordance with a correction voltage from the correction voltage circuit so as to provide a proper correction of a change in the integrated output which occurs as a result of a difference in the reflectivity of the first blind surface and the film surface.

7. The photometric circuit according to claim 6 in which the variable gain amplifier comprises a first resistor having its one end connected to the output terminal of the integrating circuit, an operational amplifier having its inverting input terminal connected to the other end of said first resistor, and a first field effect transistor connected across the inverting input terminal and the output terminal of the operational amplifier, whereby the amplification factor is controlled by changing a voltage applied to the gate of said first field effect transistor in accordance with the correction voltage outputted from the correction voltage circuit.

8. The photometric circuit of claim 7, wherein said variable gain amplifier further comprises a second resistor and a second operational amplifier having its inverting input coupled to ground through said second resistor, and a second field effect transistor coupled to said second operational amplifier and said correction voltage circuit.

9. The photometric circuit according to claim 8, in which said field effect transistors are formed as a pair of monolithic field effect transistors which form a voltage controlled variable resistance element and which have their gates inter-connected, said second field effect transistor having its drain connected to the output terminal of the correction voltage circuit, its source connected through said second resistor to the ground and also connected to the inverting input terminal of said second operational amplifier and its gate connected to the output terminal of the second operational amplifier.

10. The photometric circuit according to claim 6 in which the integrating circuit comprises a first operational amplifier having the transducer element connected across its inverting and its non-inverting input terminal, and an integrating capacitor connected across the inverting input terminal and the output terminal of the operational amplifier.

11. The photometric circuit according to claim 6 in which the differentiator comprises a differentiator capacitor.

12. The photometric circuit according to claim 2 in which the output terminal of the differentiator is connected to a logarithmic compression circuit, whereby the photocurrent output is outputted from the logarithmic compression circuit as a voltage signal which is logarithmically compressed.

13. The photometric circuit according to claim 12 in which the logarithmic compression circuit comprises a second operational amplifier having the differentiator connected to its inverting input terminal, and a logarithmic compression diode connected across the inverting input terminal and the output terminal of the operational amplifier.

14. A photometric circuit for a camera including a photoelectric transducer element for producing a photo-current signal which is a function of the intensity of light sensed by said element for a photometry operation;
 integrating means for integrating said photo current signal;
 converting means for converting the output of said integrating means to a signal substantially similar to said photocurrent signal;
 adjusting means for adjusting the output magnitude of said integrating means;
 control means for sampling the output of said converting means at a first instant when said transducer element senses light reflected from a non-film surface and at a second instant when said transducer element senses light from a film surface;
 means responsive to the relative signal strengths of said samples for controlling said adjusting means.

15. A method for correcting the output of a photometry circuit of a camera due to differences in reflectivity of a film surface comprising the steps of:
 initially sensing the light reflected from a shutter blind as it moves across the central region of an image field, and thereafter sensing light reflected from the film surface as the shutter blind uncovers said central region to generate a photocurrent representing the intensity of the reflected light;
 integrating the photocurrent to develop an integrated signal;
 differentiating the integrated signal;
 sampling the differentiated signal once while sensing light reflected from the shutter blind and once while sensing light reflected from the surface of the film;
 generating a correction signal based on the relative values of said samples;
 adjusting the amplitude of the integrated signal according to the correction signal.

16. The method of claim 15, wherein the adjusting step further comprises the step of varying the resistance of an adjustable resistance element in the feedback circuit of an operational amplifier which amplifies the integrated signal to control the amplifier gain $\alpha$ to be greater than one, less than one, or equal to one, according to the relative values of said samples.

* * * * *

UNITED STATES PATENT AND TRADEMARK OFFICE
CERTIFICATE OF CORRECTION

PATENT NO. : 4,390,258
DATED : June 28, 1983
INVENTOR(S) : Kazunori Mizokami

It is certified that error appears in the above-identified patent and that said Letters Patent is hereby corrected as shown below:

In the Claims:

Claim 9, column 10, line 54: after "said" insert --first and second--.

Claim 12, column 11, line 6: change "2" to --6--.

In the Title:

Cover page, line (54), change "PHOTOMERIC" to --PHOTOMETRIC--.

Column 1, line 1, change "PHOTOMERIC" to --PHOTOMETRIC--.

Signed and Sealed this

Fourth Day of December 1984

[SEAL]

Attest:

GERALD J. MOSSINGHOFF

Attesting Officer

Commissioner of Patents and Trademarks